(12) United States Patent
Thuss et al.

(10) Patent No.: US 10,055,621 B2
(45) Date of Patent: Aug. 21, 2018

(54) AGRICULTURE EXCHANGE

(71) Applicant: Agex Inc., Austin, TX (US)

(72) Inventors: Wendel Denman Thuss, Austin, TX (US); Jared Wright, Austin, TX (US)

(73) Assignee: AGEX, INC., Austin, TX (US)

( * ) Notice: Subject to any disclaimer, the term of this patent is extended or adjusted under 35 U.S.C. 154(b) by 0 days.

(21) Appl. No.: 15/480,764

(22) Filed: Apr. 6, 2017

(65) Prior Publication Data
US 2017/0293782 A1 Oct. 12, 2017

Related U.S. Application Data

(60) Provisional application No. 62/318,858, filed on Apr. 6, 2016.

(51) Int. Cl.
| | |
|---|---|
| *G06K 15/00* | (2006.01) |
| *G06K 7/10* | (2006.01) |
| *A01K 11/00* | (2006.01) |
| *A01K 29/00* | (2006.01) |
| *G06K 7/14* | (2006.01) |
| *G01G 17/08* | (2006.01) |

(52) U.S. Cl.
CPC ........ *G06K 7/10366* (2013.01); *A01K 11/004* (2013.01); *A01K 11/008* (2013.01); *A01K 29/00* (2013.01); *G01G 17/08* (2013.01); *G06K 7/1413* (2013.01)

(58) Field of Classification Search
CPC .. A01K 11/006; A01K 11/008; A01K 29/005; A01K 11/004; A01K 29/00; G01G 17/08; G06K 7/10366; G06K 7/1413

USPC .......................................................... 235/383
See application file for complete search history.

(56) References Cited

U.S. PATENT DOCUMENTS

| | | | | |
|---|---|---|---|---|
| 7,584,136 | B2 * | 9/2009 | Shuler ................. | G06Q 10/087 705/26.1 |
| 8,736,440 | B2 * | 5/2014 | Kwak .................. | A01K 11/006 119/51.02 |
| 8,988,200 | B2 * | 3/2015 | Lee .......................... | G06K 1/18 235/384 |
| 9,167,800 | B2 * | 10/2015 | Spicola, Jr. .......... | A01K 29/005 |
| 2012/0065483 | A1 * | 3/2012 | Chung ................. | A01K 11/003 600/310 |
| 2013/0222141 | A1 * | 8/2013 | Rhee .................... | G06F 19/3418 340/573.3 |
| 2016/0180060 | A1 * | 6/2016 | Nelson ................. | A01K 11/008 702/19 |

* cited by examiner

*Primary Examiner* — Seung Lee
(74) *Attorney, Agent, or Firm* — Daniel J. Chalker; Edwin S. Flores; Chalker Flores, LLP (57) ABSTRACT

An agricultural exchange system includes a smart chute for isolating a live animal. The live animal can be weighed, photographed, and identified while in the smart chute. A subscriber unit receives measured data and transmits the data to a centralized server. The centralized server stores measured data and identification data as part of a product data card for the live animal. The centralized server provides the data as needed to potential buyers directly or through a service provider. Potential buyers may access the data in real time to obtain detailed information on a live animal prior to purchase.

23 Claims, 8 Drawing Sheets

AGRICULTURE EXCHANGE

This application claims the benefit of provisional application No. 62/318,858.

FIELD OF THE DISCLOSURE

The present disclosure relates to an agricultural exchange that provides livestock tracking and sales systems.

BACKGROUND OF THE DISCLOSURE

Livestock is often sold at live auctions. Buyers often desire more information than such settings provide regarding sale items. Auctioned cattle may be sold on a per-pound basis, and the animals must be weighed (and final price set) after a sale is agreed upon.

DETAILED DESCRIPTION OF THE DRAWINGS

The present disclosure relates to an electronic or digital agriculture exchange ecosystem where product data is collected, processed, stored, and distributed on demand. Livestock assets are tagged (e.g., with UHF RFID ear tags or QR codes) corresponding to a universal Livestock Identification Number (LIN for each animal). The system processes and stores animal data within a cloud-based infrastructure. Exchange users access the data through smartphone, tablet, computing device, and browser applications in some embodiments. The exchange incorporates full transaction facilitation: once an animal has been marketed and sold, the system provides payment services (pays seller, collects from buyer, pays commissions, etc.) and coordinates transfer logistics. In addition to creating another sales channel for livestock, the system connects individual animals to their data which can be archived after a transfer. By sensing the ear tag, subsequent owners of the livestock may access all data associated with that specific animal through mobile app or browser-based applications. The resulting data is stored on an electronic product data card that is completely portable and designed to interface through standard API with a variety of industry data solutions. The data follows the animal through its entire lifecycle. Included data begins with an initial photo, ear tag ID, weight, date and time of collection. Optionally a product data card includes vaccination records, medical treatment, or general condition/comments. This data becomes associated with the LIN and is available to subsequent participants in the supply chain, providing a clearinghouse of product data.

An end-user (e.g., a rancher, buyer, seller) in some embodiments interacts with the agriculture exchange through a service provider. An example service provider is a company that interacts directly with buyers and sellers through a subscription or fee-based arrangement. In some scenarios, an agriculture exchange operator provides multiple (e.g., competing) service providers with proprietary hardware and software for facilitating aspects of disclosed systems for their respective customers. For example, a service provider is provided a hardware/software package for processing animal data at facilities like ranches, stockyards, or auction houses. An example hardware package includes a single-animal squeeze chute which is equipped to weigh the animal, detect the RFID or QR code ear tag, and wirelessly (e.g., Bluetooth) transmit acquired data to a provided smartphone. The RFID or QR code ear tag may be applied to the animal when it first enters the squeeze chute to be weighed. and processed. After an animal is ear tagged, additional data may be captured on group scales, trailers, working pens or corrals. In some embodiments, animal data (e.g., measured weight) is collected and accessed by ranchers to perform inventory or monitor the performance of their herd. Such data could also be used by financial institutions to monitor collateral on loans and so forth.

Livestock and animals in some embodiments use RFID based ear tags (e.g., UHF RFID tags) to identify, track, and process animals. RFID is abbreviated from radio-frequency identification and includes technology that uses electromagnetic fields to automatically identify and track tags that are attached to the animals. RFID tags may be passive tags or active tags. When using passive tags, an RFID reader (a.k.a., interrogator) emits radio waves. The passive tag collects energy from the emitted radio waves and generates a signal with ID information. Active tags include a local power source such as a battery and may operate at relatively greater distances (e.g., hundreds of yards away). RFID tags may be ear tags or may be implanted in an animal.

Livestock and animals are, additionally or alternatively, processed in some embodiments with QR codes on ear tags. QR code is abbreviated from Quick Response Code and is a type of two dimensional (e.g., matrix) barcode. Such barcodes are machine readable through optical technology. In some embodiments, the codes include a square grid on a white background. The codes can be read by an imaging device such as a camera and processed until the code's image can be accurately interpreted by software. The QR code can be a prominent portion of the ear tag for easier reading from a greater distance. A prominent QR tag can be scanned at a much greater distance and is instantly recognizable as a QR code.

Figure 1:
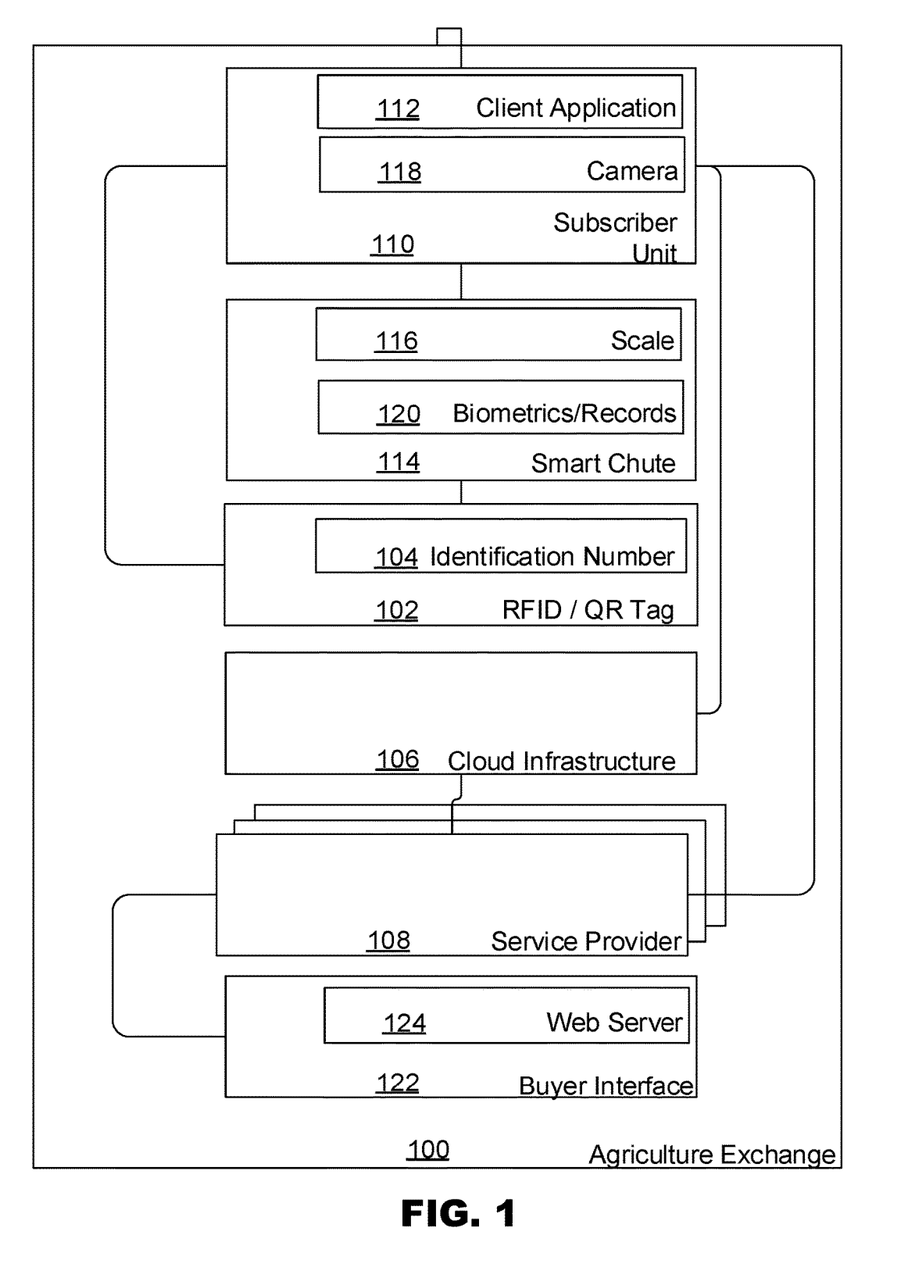
FIG. 1 is a block diagram depicting selected elements of a disclosed agriculture exchange.

Disclosed embodiments are described in the context of several patent figures. FIG. 1 illustrates agriculture exchange 100. As shown, agriculture exchange 100 includes cloud infrastructure 106, which provides users of agriculture exchange 100 with virtualized computing resources (e.g., storage, searching, computing) over the Internet (i.e., in the cloud). Agriculture exchange 100 includes service provider 108, which may be part of a network (e.g., plurality) of service providers. Livestock owners access the agriculture exchange 100 directly or through service provider 108. Service provider 108 may lease (from the agriculture exchange) and maintain integrated software and hardware packages for collecting animal data. For example, a service provider may lease smart chute 114 with data acquisition hardware including scale 116 and biometric/records module 120. Likewise, a service provider (e.g., service provider 108) may license client application 112 for use with any smartphone as part of the data collection portion of agriculture exchange 100.

Larger farm animals (e.g., cattle or horses) are separated and processed using chutes. Chutes are commonly made of a strongly built stall or cage which can hold the animals safely while they are examined, tagged, or treated. Disclosed embodiments include smart chute 114, which includes scale 116 and biometric/records module 120. Scale 116 weighs an animal. Biometric/records module 120 provides additional information on an animal. Module 120 includes a keyboard for manual entry of such information. Alternatively, or in addition, module 120 includes sensors for measuring ambient air temperature, body temperature, blood pressure, body density, lean mass sensor, fat sensor, water percentage sensor, and the like. In some embodiments, module 120 includes an RFID tag or QR code reader for automatically determining the livestock identification number (e.g. identification number 104) associated with an animal. Module 120 then stores the information automatically obtained from animals as they pass through smart chute 114. Smart chute 114 may include a camera (not depicted) for photographing livestock from one or more angles.

An operator processes animals through smart chute 114 using subscriber unit 110 to capture and record data related to each animal. Subscriber unit 110, in one embodiment, is a smartphone running client application 112. The subscriber unit, in addition to allowing for capturing and processing animal data, permits a user access to access data from agriculture exchange 100. Camera 118 takes one or more photographs of an animal, and in some embodiments is enabled for detecting heat signatures (e.g., through IR photography) given off by an animal for further documenting animal health. The data is captured and stored in cloud infrastructure 106.

In FIG. 1, client application 112 communicates wirelessly with RFID or QR code tag 102. RFID or QR code tag 102 includes the LIN, which is a unique livestock ID number for an animal. Client application 112 is communicatively coupled to smart chute 114 and receives weight data associated with a particular LIN.

The user of subscriber unit 110 photographs the animal utilizing the integral camera 118. In addition to hardware generated data (e.g., measured data from smart chute 114 including scale 116 and biometric/records module 120), client application 112 acts as the collection point for product owner data, location, and time. Subscriber unit 110 in turn passes the data to cloud infrastructure 106 via an Internet connection (e.g., over Wi-Fi or cellular). Subscriber unit 110 passes the data in some embodiments through service provider 108. In the event there is no Internet connection, client application 112 enables subscriber unit 110 to gather data, store it, and seamlessly upload it to the cloud when Internet connectivity is restored. This helps to continue operations in remote areas where Internet connectivity is unavailable. Client application 112 also allows the operator to assemble marketing lots from animal data collected and place them for sale.

As shown in FIG. 1, agriculture exchange 100 includes buyer interface 122. Buyer interface 122 includes web server 124 that in some embodiments provides a mobile friendly web application or works with native mobile applications (e.g., on Android or iOS platforms) on smartphones. Buyer interface 122 and web server 124 provide for the collection of buyer information including banking information for bid-enabled accounts. The interface further allows buyers to search, view and bid on livestock. The bid entry process requires entering delivery instructions for cattle should a buyer win. In some embodiments, buyer interface 122 interacts with multiple remote devices (e.g., computers and smartphones) to cause bidding to close simultaneously on each device. Buyer interface 122 also facilitates private contract sales (e.g., one buyer and one seller) at an agreed price.

In some embodiments of the agriculture exchange, service providers coordinate with livestock owners to run cattle through smart chutes, which as described are equipped for collecting, storing, and transmitting data associated with the animals. When an animal is processed, a subscriber unit running a client application collects and forwards data to centralized systems (e.g., cloud infrastructure 106 possibly through service provider 108). The specialized equipment reads the LIN and the weight of the animal and automatically associates the data together via a smart phone app such as client application 112). In the embodiment shown in FIG. 1, service provider 108 uses data collected by the system to market livestock on a digital buyer interface (e.g., buyer interface 122). In some embodiments, sellers or buyers pay a sales commission and delivery fee once cattle are sold. Pricing can be auction-based, indexed, fixed, or negotiated. In some embodiments of agriculture exchange 100, service providers act as independent contractors and lease equipment from the agriculture exchange operator (e.g., owner). Compensation to service providers (e.g., service provider 108) may include a sales commission distributed automatically via buyer interface 122.

Figure 2:
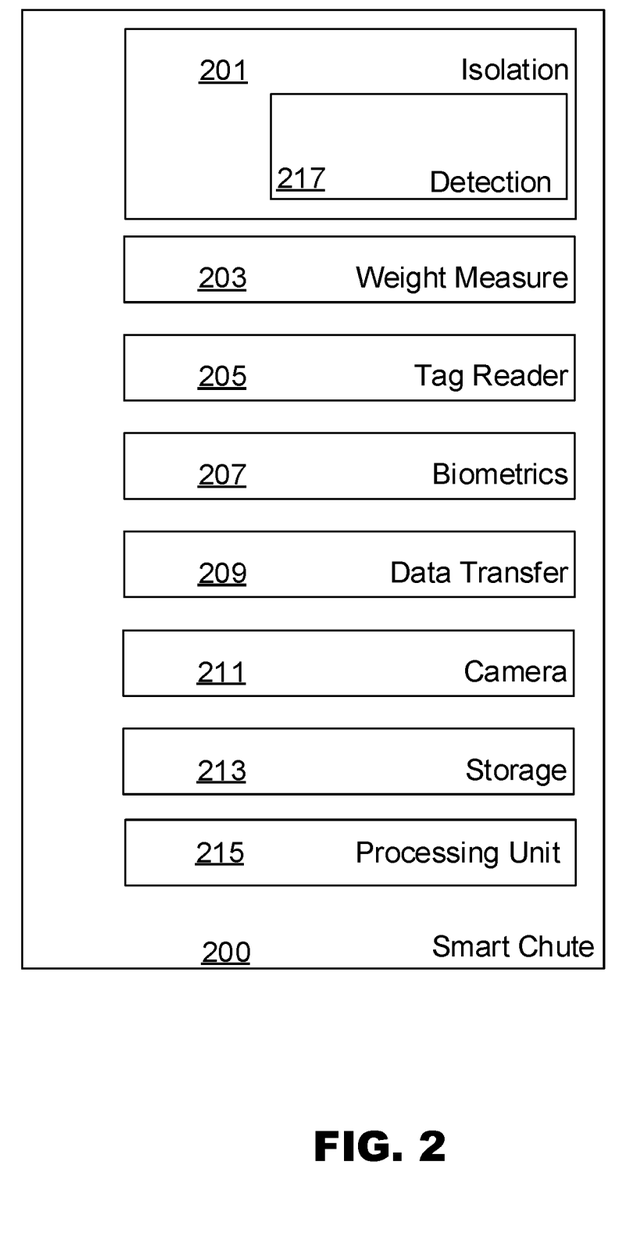
FIG. 2 is a block diagram of a smart chute for an agriculture exchange.

FIG. 2 depicts additional details for a smart chute (e.g., smart chute 114 in FIG. 1). As shown, smart chute 200 includes isolation unit 201. Isolation unit 201 includes a panel, gate, alley or similar element for isolating an animal for processing. Isolation unit 201 may include an automatic gate, hydraulic cylinders, or similar mechanical apparatus for separating an animal after detection by optional detection unit 217 (e.g., infrared sensor, weight sensor, laser sensors, etc.). Weight measure unit 203 is veterinary-grade scale for measuring weight in large animals. Weight measure unit 203 can be placed within smart chute 200 as needed or may be integrated into it.

As shown, smart chute 200 further includes tag reader 205 for reading RFID or QR tag 102 (FIG. 1). Tag reader 205 and RFID or QR tag 102 communicate via radio waves or light waves. RFID or QR tag 102 contains a QR code or integrated circuit and an antenna used to transmit data to tag reader 205 (which acts as an interrogator). Smart chute 200 optionally includes biometrics module 207. Biometrics unit 207 receives animal data from transducers (e.g., sensors) that measures animal characteristics such as animal temperature, ambient temperature, ultrasound images, magnetic resonance images, animal blood pressure, and so on. Optional camera 211 automatically photographs the animal. Camera 211 may include multiple sensors for photographing the front, top, sides, and back of the animal. Animal data is collected and processed by processing unit 215.

Storage module 213 consists of an SSD, hard drive, memory card, RAM, ROM, or the like and stores animal data. Smart chute 200 communicates stored data or data streamed in real time with subscriber unit 110 (FIG. 1). Smart chute 200 is enabled for communicating to cloud infrastructure 106 (FIG. 1), in some cases, through service provider 108 (FIG. 1). Such communication occurs through data transfer module 209, which comprises a Bluetooth module, Wi-Fi module, cellular module, near field communication (NFC) module, and/or wired connection.

In FIG. 2, biometrics module 207 may include two-dimensional or three-dimensional scanner technology for measuring physical characteristics (e.g., height, volume, etc.) of an animal. In some embodiments, processing unit 215 analyzes received biometric data (e.g. from biometrics module 207) and transforms the data for display as graphical representations, numerical representations, graphical comparisons, numerical comparisons, and so on. For example, processing unit 215 includes machine instructions to process ultrasound data from biometrics module 207 and transform the data into a resulting fat content measurement, lean muscle content measurement, body mass index number, or the like. Processing unit 215 may further include machine instructions to process 2-D scan data, 3-D scan data, or camera data to generate a 3-D image of the animal that can be virtually rotated and studied. In some embodiments, scan data from multiple animals is processed, transformed, and displayed simultaneously to compare the size or characteristics of two animals against one another (e.g., on display 126 of FIG. 1).

Figure 3:
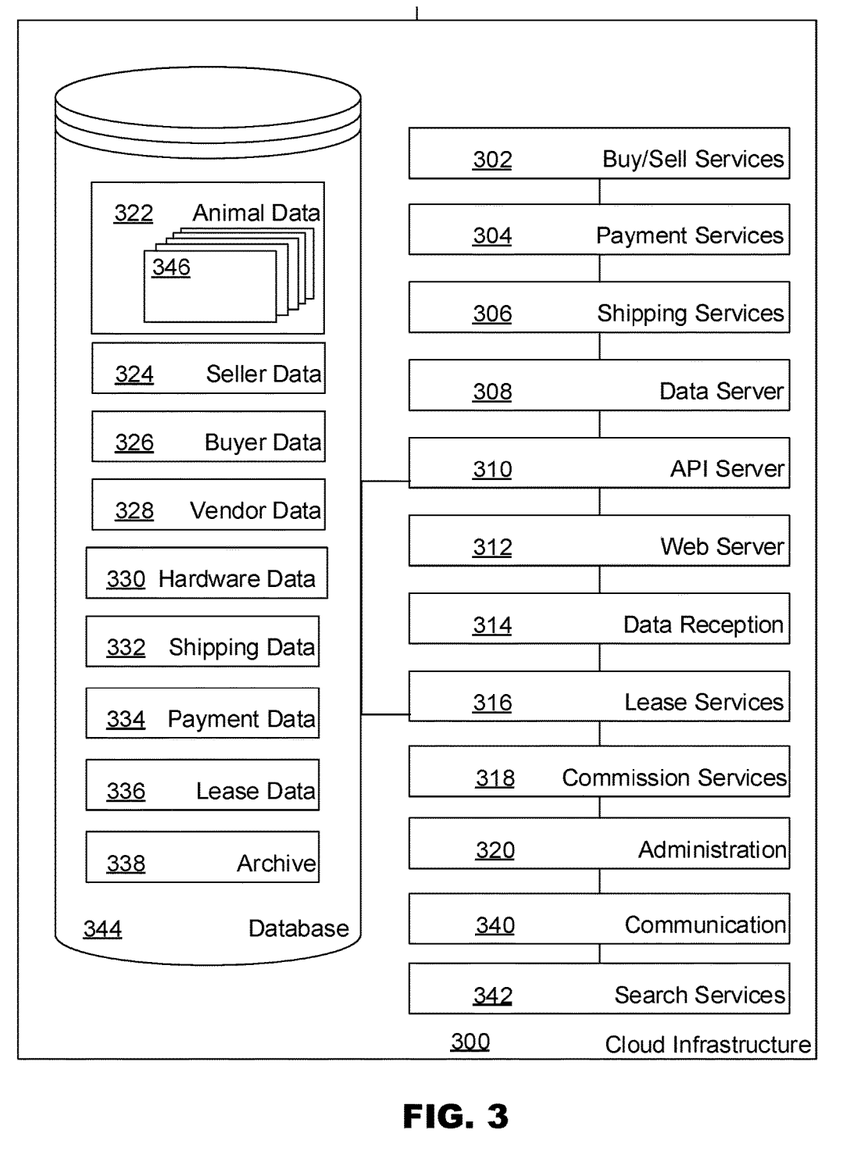
FIG. 3 is a block diagram of a cloud infrastructure for an agriculture exchange.

FIG. 3 is a block diagram of cloud infrastructure 300, which is identical to or similar to cloud infrastructure 106 (FIG. 1). Cloud infrastructure 300 provides an Internet-based platform with scalable data storage and processing resources. Users (service providers, buyers, sellers, administrators, ranchers, lenders) of agriculture exchange 100 (FIG. 1) access cloud infrastructure 300 for storing, accessing, and searching data related to products or other users. For example, a potential buyer can search for a seller or a particular animal. The buyer can search based on a price, location, score, or other criteria. Access to cloud infrastructure 300 in some embodiments is provided through a service provider (e.g., service provider 108 in FIG. 1).

Buy/sell services module 302 facilitates buying and selling of animals. In some embodiments, a potential buyer uses search services module 342 to search for a particular animal. The buyer enters search criteria through web server 312. In turn, search services module 342 accesses database 344 for relevant animal data. Database 344 includes product data card 346 stored within animal data 322. Product data card 346 includes searchable information (e.g., age, breed, species, location, color, temperament, notes, size, etc.) related to a particular animal. Buy/sell services module 302 handles auction services and takes bids from potential buyers. Buy/sell services module 302, in some embodiments, communicates with multiple end user devices (e.g., smart phones, computers) through Web server 312 to update users simultaneously and close an auction simultaneously across all devices.

Payment services module 304 facilitates payment for animals. Payment services module 304 accesses and updates payment data 334 with account information for buyers, sellers, service providers, vendors, and so on. Shipping services module 306 accesses and updates shipping data 332 for buyers and sellers. Shipping services module 306 accesses third-party vendor information and provides shipping estimates prior to the close of an auction, for example. Optionally, the system can automatically include estimated shipping costs (for a particular buyer) when ranking animals for the buyer.

Cloud infrastructure 300 stores exchange data in database 344. As discussed, cloud infrastructure 300 receives this data through data reception module 314 from service providers, buyers, sellers, or vendors. A service provider or end user accesses the data (e.g., animal data, buyer data, seller data) through data server 308.

Data server 308 accesses database 344 for exchange information. As an example, seller data 324 includes searchable information for animal sellers. Likewise, buyer data 326 includes relevant information for past and prospective buyers of animals. Vendor data 328 includes information related to auctioneers, veterinarians, shippers, or handlers. Shipping data 332 includes third-party shipping rates. Payment data 334 includes account information (e.g., bank routing numbers, wiring information) for buyers, sellers, service providers, and vendors.

Figure 4:
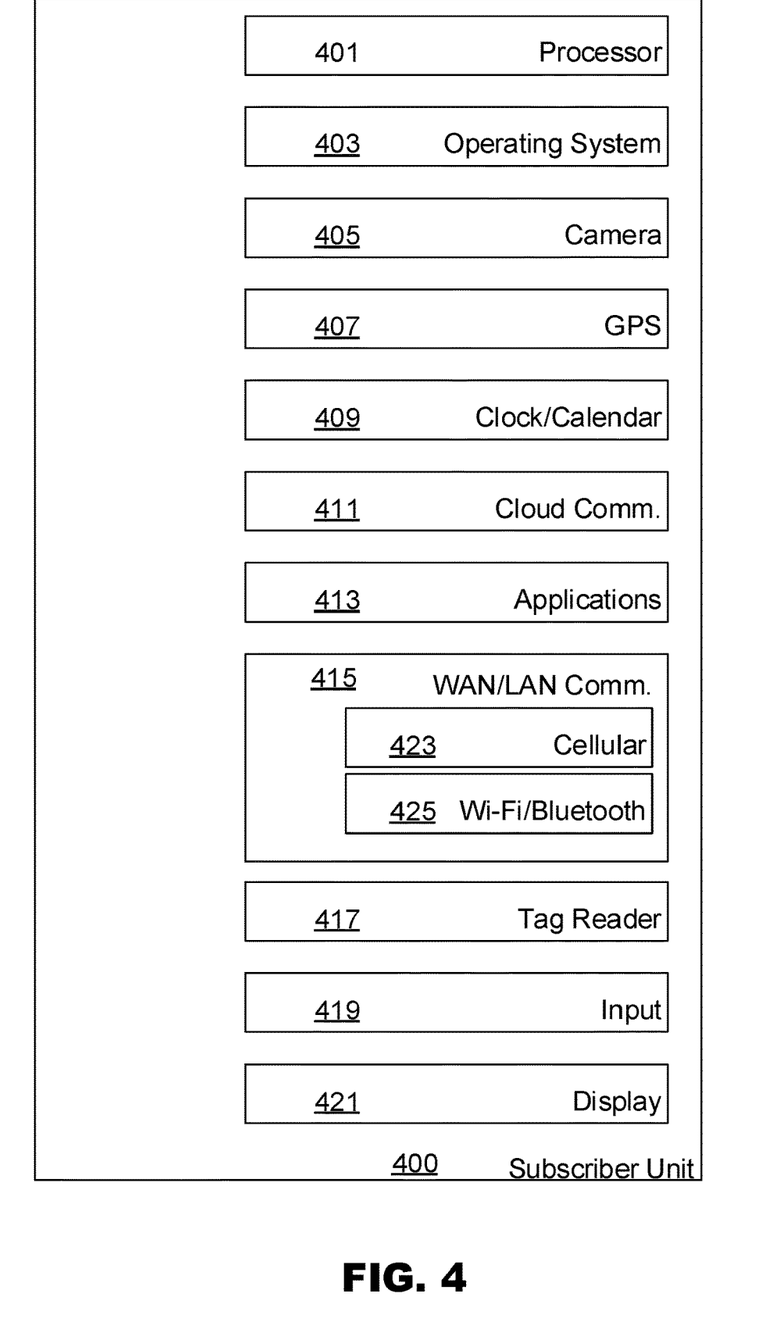
FIG. 4 is a block diagram of a subscriber unit related to disclosed systems.

The agriculture exchange may facilitate the sale or lease of specialized equipment (e.g., smart chute 200 in FIG. 2 or subscriber unit 400 in FIG. 4. Lease services module 316 facilitates and manages the lease of this proprietary equipment. Lease data 336 stores data related to hardware such as identification numbers and maintenance records for equipment. Commission services module 318 calculates and pays commissions to service providers, shippers, auctioneers, animal handlers, or other vendors. Archive data 338 includes stored data from animals, equipment, past transactions, and the like.

The various modules (e.g., buy/sell services module 302) in cloud infrastructure 300 comprise or access hardware and software resources (e.g., machine-readable instructions executing on one or more processors) for supporting the disclosed tasks. Cloud infrastructure 300 is accessible by Internet-enabled devices such as smartphones and computers. These devices run on myriad platforms (e.g., iOS™, Android™, Linux™, MAC-OS™, Windows™, etc.) that interact with communication module 340. In some embodiments, API Server 310 facilitates access with these devices, including through third party web servers operated by service providers. Web server 312 interacts with web-enabled subscriber units to facilitate the services provided by cloud infrastructure 300. For example, web server 312 facilitates buy/sell services, payment services, shipping services, and the like.

FIG. 4 is a block diagram of subscriber unit 400, which is identical to or similar to subscriber unit 110 in FIG. 1. Subscriber unit 400 may be a smart phone, tablet, or other personal computing device. In one scenario, a rancher uses subscriber unit 400 when processing an animal to be sold through the market place. Subscriber unit 400 is a handheld device that reads the RFID tag or QR code for the animal, takes a photograph of the animal, and provides a date/time stamp for the information. Tag reader 417 communicates through reflected light (e.g., QR code readers), radio signals or NFC technology with animal tags (e.g., RFID or QR code tag 102 in FIG. 1). Subscriber unit 400 also communicates with smart chute 114 (FIG. 1) or smart chute 200 (FIG. 2) to process animal data or exchange data with cloud infrastructure 300 (FIG. 3). The rancher or a service provider captures the data, stores the data, and uploads the data through an Internet connection in some embodiments.

As shown, subscriber unit 400 includes processor 401 which performs with operating system 403, applications 413, and other modules to achieve the described functionality. Input module 419 receives keyboard or spoken input related to an animal or the seller. In the above scenario, the rancher types or speaks notes related to an animal through input module 419. Input module 419 receives, processes, and stores data in an animal's product data card (e.g., product data card 346 in FIG. 3).

Clock/calendar 409 provides a time/date stamp for data collected by subscriber unit 400. Applications 413 include instructions for time/date stamping photographs taken through camera 405. Global positioning system (GPS) module 407 provides location data related to an animal. Shipping services module 306 (FIG. 3) uses this location data to estimate shipping costs. The system may stamp photographs with location data in addition to the time/date information. Applications 413 may alternatively store location, time, and date information within a photograph's metadata.

Cloud communication module 411 includes instructions and credentials that permit subscriber unit 400 to access the cloud infrastructure for agriculture exchange 100 (FIG. 1). This access is achieved through data connection(s) provided by WAN/LAN communications module 415. WAN/LAN communications module includes cellular module 423 which enables access through 3G, 4G, LTE, and similar (e.g., future) cellular technologies. Likewise, subscriber unit 400 is enabled with Wi-Fi, Bluetooth, and NFC communication through Wi-Fi/Bluetooth module 425. If a communications link is unavailable, processor 401 includes memory (not depicted) for storing data until the communication link becomes available. Aspects of disclosed systems may communicate through an Internet of Things, LAN, WAN, PAN, CAN, MAN, WLAN, SAN, EPN, VPN, or other network of physical objects that enable autonomous collection and exchange of data among machines.

Still referring to FIG. 4, applications 413 includes functionality (through machine-readable instructions executed by processor 401) for connecting wirelessly to described hardware package elements (e.g., smart chute 200, biometric module 120, camera 118, weight measurement unit 203, tag reader 205, biometrics module 207, data transfer module 209, detection unit 217, and scale 116). In this way, subscriber unit 400 accepts animal data and user data. In some embodiments, this allows subscriber unit 400 to serve as the collection point for product owner data, animal data, location data, time data, and so on. In a typical scenario, subscriber unit 400 is a smartphone that passes data to the cloud via an Internet connection (Wi-Fi or cellular). Applications 413 can gather data while not connected to the Internet, store it, and seamlessly upload it to the cloud when connectivity is restored. Applications 413 further allow the operator to assemble marketing lots from animal data collected and place them for sale.

Figure 5:
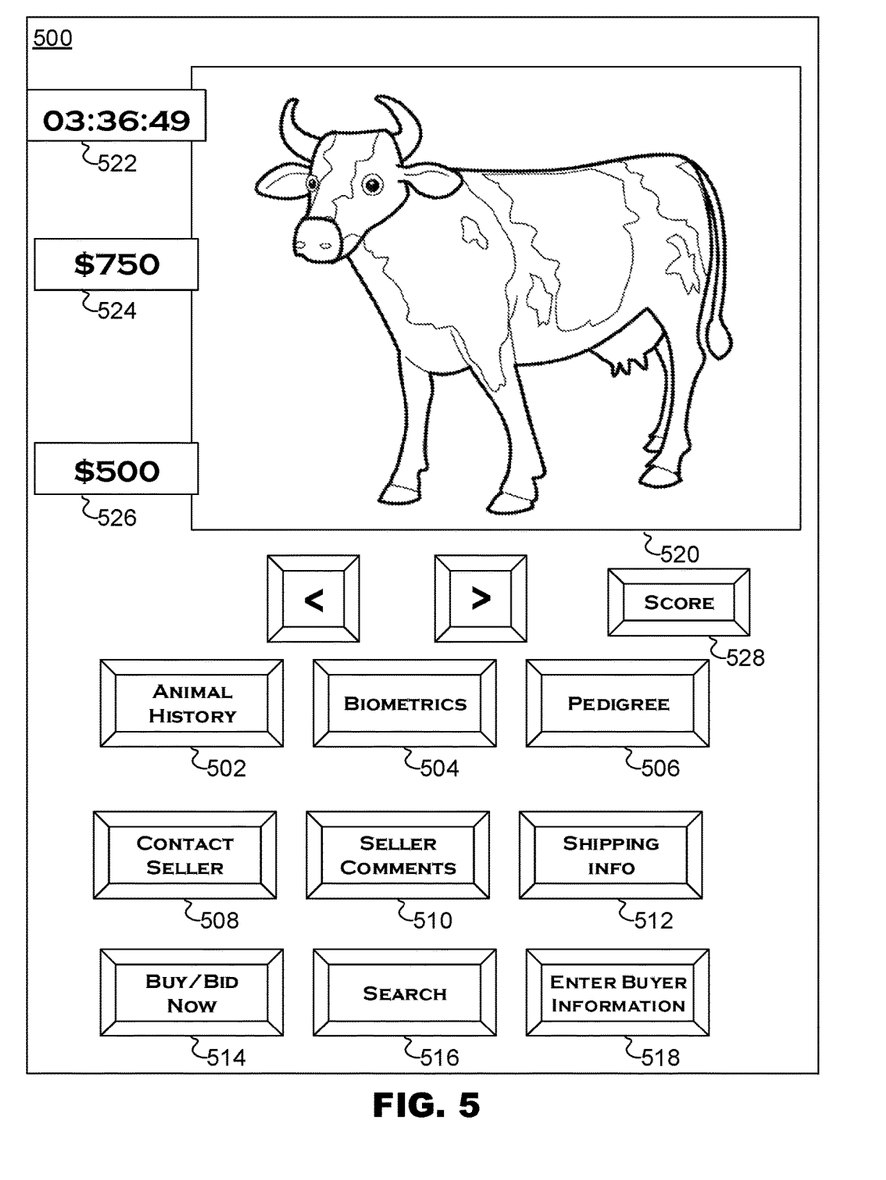
FIG. 5 depicts elements of a user interface for a disclosed system which allows interactive participation with an agriculture exchange for searching and buying livestock.

FIG. 5 depicts a user interface 500 provided through agriculture exchange 100 (FIG. 1). The user interface is presented on a display and provides a potential buyer with an interactive way to research and buy animals. Agriculture exchange 100 may act as an exchange accessed by multiple (e.g., competing) service providers that each provide their own versions of user interface 500 based on data obtained, stored, and serviced through agriculture exchange 100. In one embodiment, Web server 312 (FIG. 3) provides user interface 500 to a potential buyer through the buyer's smart phone.

As shown, user interface 500 includes animal image 520. In some embodiments image 520 can be rotated to obtain continuous three-dimensional viewpoints. Data for image 520 is obtained through camera 118 (FIG. 1), camera 211 (FIG. 2), or cameras integrated into a smart chute (e.g., smart chute 114 in FIG. 1 or smart chute 200 and FIG. 2). Animal history link 502, biometrics link 504, and pedigree link 506 each lead to data from animal data 322 (FIG. 3). Through these links, a potential buyer can research the animal shown in image 520. By clicking search link 516, a buyer is taken to a search window for entering search criteria. This criterion is used by search services module 342 (FIG. 3) to find relevant animals within database 344 (FIG. 3). If interested in an animal, the buyer bids on or purchases (e.g., for a fixed price) the animal through Buy/Bid Now link 514. A purchase may be from an auction or based upon an agreed price (e.g., buy-now price 524).

In one embodiment, Buy/Sell services module 302 (FIG. 3) serves the data provided in interface 500 through web server 124 using buyer interface 122. Buyer interface 122 may provide data directly to a buyer's smart phone through service provider 108 (FIG. 1). As shown, interface 500 includes auction time remaining 522, buy-now price 524, and current bid 526. Buyer data is stored in buyer data 326 (FIG. 3). Prior to bidding on an animal or attempting to purchase an animal, a buyer enters his/her information through Enter Buyer Information link 518.

"Contact seller" link 508 facilitates communicating with the seller through email, text, or telephone. "Seller comments" link 510 enables buyer/seller interactions through a question/answer forum. For example, a buyer can ask about an animal's temperament or health and other buyers can see the resulting seller responses. Shipping info link 512 accesses the shipping information stored in shipping data 332 and calculates a shipping cost from the animal's location to a prospective or actual buyer. In addition, shipping info link 512 can provide a buyer access to tracking information after a purchase.

In an embodiment, buy/sell services module 302 (FIG. 3) processes data and preferences to compute a relevant score for a particular animal, uniquely calculated for a particular buyer. The potential buyer accesses the score through score link 528 (FIG. 5). Buy/sell services module 302 computes the score by processing information including: buyer shipping information (including animal location, buyer location, carrier availability and required timeframe), buyer preferences determined or computed from buyer information (e.g., buyer data 326), and search data. Accordingly, the agriculture exchange can rank an animal for a potential buyer by processing stored data related to the buyer, a prospective animal, and other potential animals.

Figure 6:
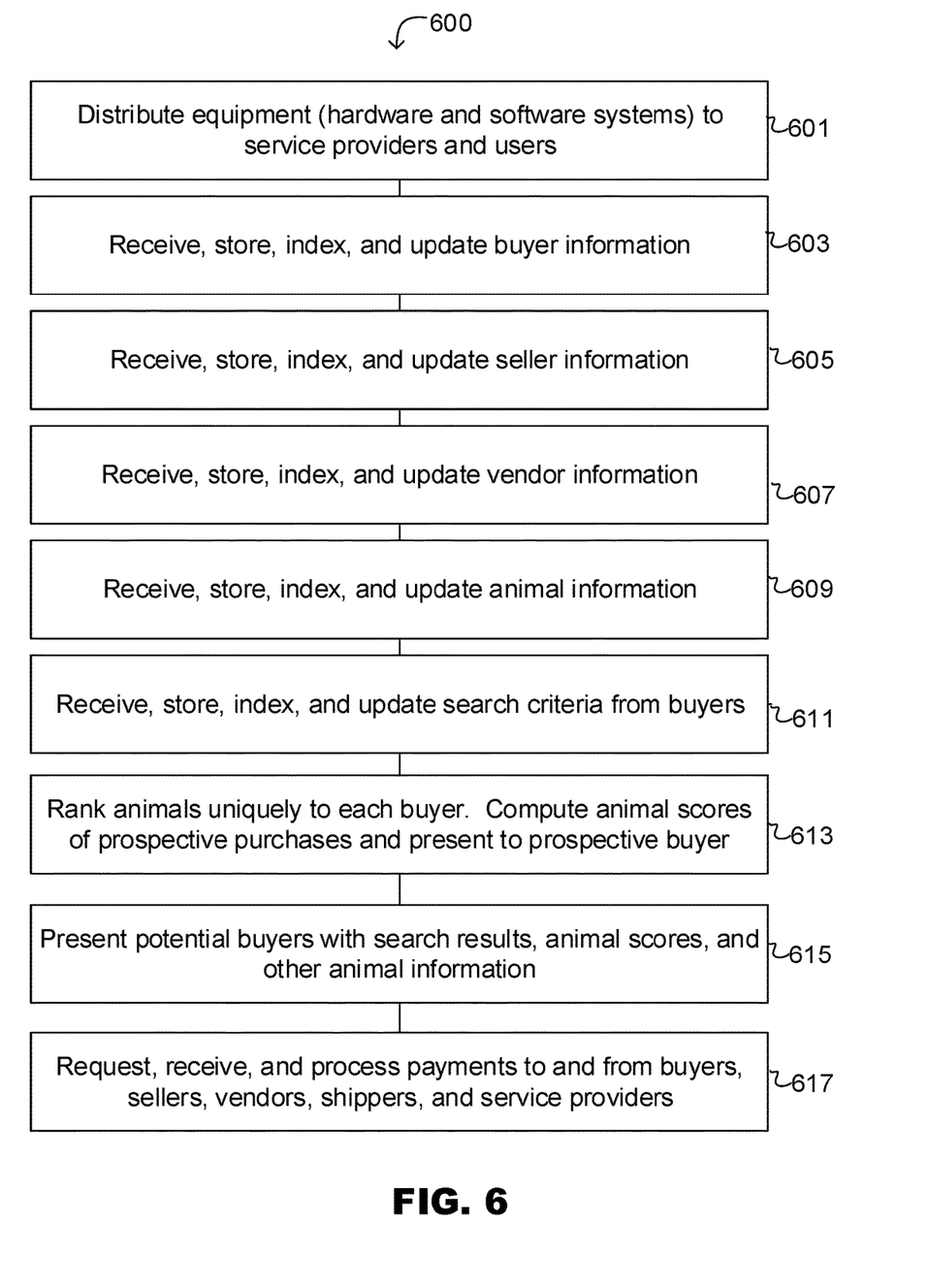
FIG. 6 is a flow diagram for providing a disclosed agriculture exchange.

FIG. 6 depicts an embodied method for conducting an agriculture exchange (e.g., agriculture exchange 100 in FIG. 1). Block 601 relates to distributing equipment to service providers and users. Equipment can be sold, loaned, given, or leased to users including as examples buyers, sellers, service providers, and administrators. The services module 316 (FIG. 3) facilitates record-keeping and logistics associated with block 601. Hardware data 330 (FIG. 3) and leased data 336 (FIG. 3) includes tracking information for the distributed equipment. The equipment includes special-purpose machines having proprietary information and programs specifically for the agriculture exchange. The equipment is specially programmed for receiving and processing data associated with livestock assets, buyers, sellers, and vendors.

Blocks 603-611 related to receiving, storing, indexing, and updating information related to buyers, sellers, vendors, animals, and search criteria. The components of the agricultural exchange 100 are specially programmed for receiving, processing, and transforming data from the multiple sources into usable form by agricultural exchange participants. Block 613 includes ranking animals uniquely to each buyer. This information is computed by the agriculture exchange according to information stored in database 344. A prospective purchase is ranked and the ranking (e.g., score, grade) is presented to the potential buyer. Block 613 takes into account unique circumstances for a buyer including preferences, location, timeframe requirements, budget, past purchases, and so on. Block 615 includes presenting the potential buyer with search results, animal scores, and other animal information. Block 615 may be performed by iteratively populating user interface 500 (FIG. 5). Block 617 relates to processing payments to and from buyers, sellers, vendors, shippers, and service providers. Block 617 is performed by the agriculture exchange and results in a centralized system for accounting, receiving, and distribution of funds.

In disclosed systems, interfaces are driven by cloud based data/API architectures organized around a universal product serial number-known as the LIN. Each ear tag (or other unique hardware ID) is assigned a unique number (e.g., a 32 or 96-bit serial number) for a particular animal, which is associated with the animal forever. In some embodiments, no other data is stored on the tag. Instead, all relevant data about an animal is stored on the exchange's cloud infrastructure and identified via the LIN. The LIN allows current owners, managers, and buyers to access historical data and enter their own as it is gathered through a variety of applications and platforms.

Figure 7:
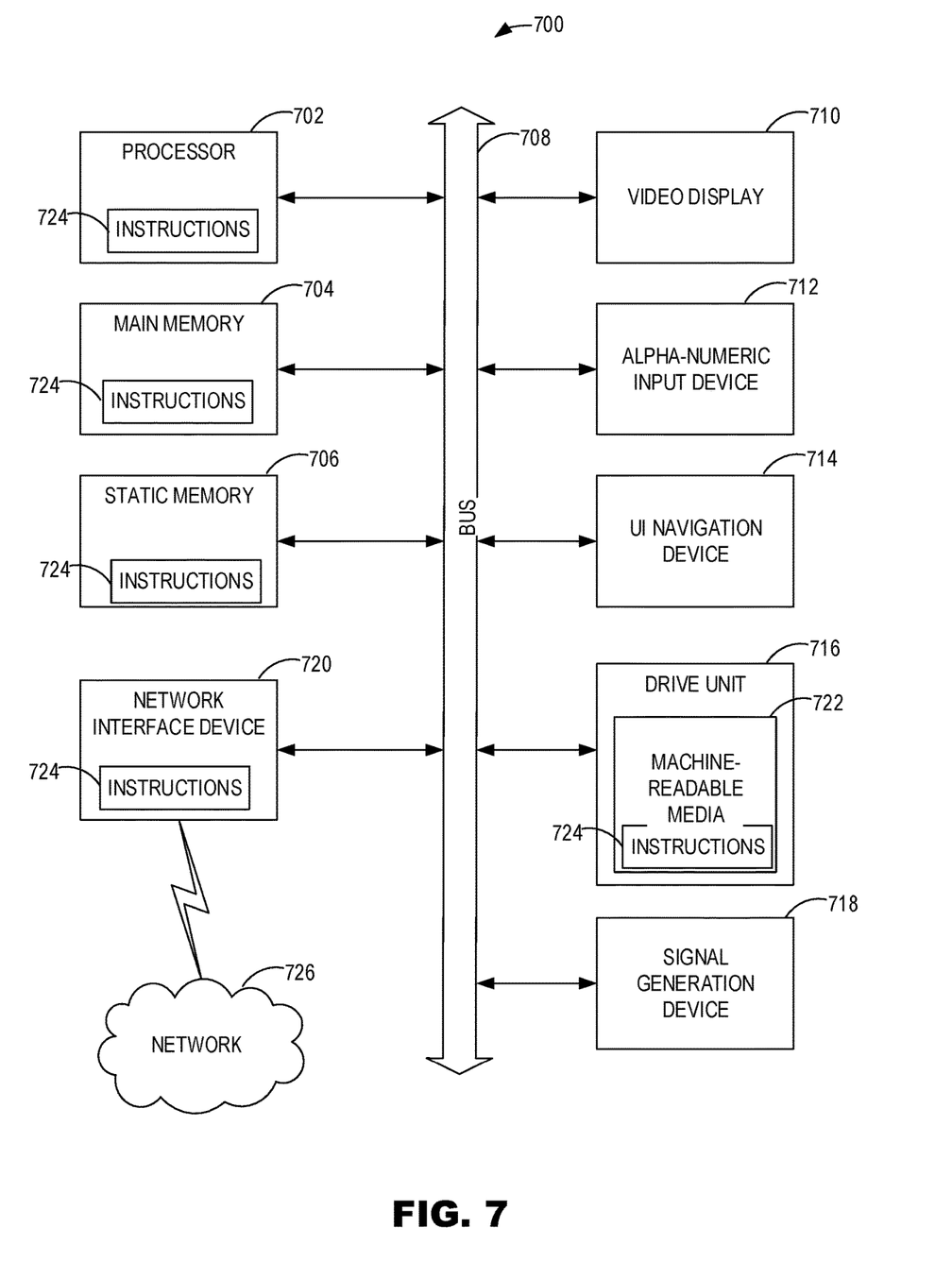
FIG. 7 is a block diagram for data processing systems (e.g., processors) that interact and perform in disclosed systems to provide and participate in an agriculture exchange.

Some components of the agriculture exchange are performed by specially programmed data processing systems that contain proprietary systems (e.g., applications, firmware, software) for receiving, processing, transforming, and communicating data for participants. Components of an example data processing system are shown in FIG. 7. As shown, data processing system 700 includes a processor 702 (e.g., a central processing unit, a graphics processing unit, or both) and storage 701 that includes a main memory 704 and a non-volatile memory 726. Drive media 722 and other components of storage 701 communicate with processor 702 via bus 708. Drive media 722 includes a magnetic or solid state machine-readable medium 722 that may have stored thereon one or more sets of instructions 724 and data structures (not depicted) embodying or utilized by any one or more of the methodologies or functions described herein. The instructions 724 may also reside, completely or at least partially, within the main memory 704, within non-volatile memory 726, and/or within the processor 702 during execution thereof by the data processing system 700. Data processing system 700 may further include a video display unit 710 (e.g., a television, a liquid crystal display or a cathode ray tube) on which to display Web content, multimedia content, and input provided during collaboration sessions. Data processing system 700 also includes input device 712 (e.g., a keyboard), navigation device 714 (e.g., a remote control device or a mouse), signal generation device 718 (e.g., a speaker) and network interface device 720. Input device 712 and/or navigation device 714 (e.g., a remote control device) may include processors (not shown), and further memory (not shown).

Instructions 724 may be transmitted or received over network 767 (e.g., a multimedia content provider network) via network interface device 720 using any one of a number of transfer protocols (e.g., broadcast transmissions, HTTP).

As used herein the term "machine-readable medium" should be construed as including a single medium or multiple media (e.g., a centralized or distributed database, and/or associated caches and servers) that may store all or part of instructions 724. The term "machine-readable medium" shall also be taken to include any medium that is capable of storing, encoding, or carrying a set of instructions (e.g., instructions 724) for execution by a machine (e.g., data processing system 700) and that cause the machine to perform any one or more of the methodologies or that is capable of storing, encoding, or carrying data structures utilized by or associated with such a set of instructions. The term "machine-readable medium" shall, accordingly, be taken to include but not be limited to solid-state memories, optical media, and magnetic media.

In accordance with some disclosed embodiments, data processing system 700 executes instructions 724, which include instructions for providing cloud infrastructure resources, Web servers, buyer interfaces, and client applications. Instruction 724 may include instructions for providing buy/sell services, payment services, shipping services, data servers, API service, lease services, commission services, search services, and system administration (e.g., through administration module 320 in FIG. 3). Instructions 724 may include instructions for processing transducer input and detecting the presence of an animal, determining the weight of an animal, reading the tag of an animal, processing photographic images of an animal, and storing associated data. Instructions 724 may operate on processor 401, as an example, and form operating system 403 and applications 413. Instructions 724 may include instructions for processing GPS data, camera data, clock and calendar data, and tag input. Instructions 724 may include instructions for presenting animal data, user data, seller data, and buyer data on a display (e.g., display 421 in FIG. 4). Instructions 724 may include instructions for receiving input through a keyboard or other input device (e.g., a recorder). Instructions 724 may include instructions for interacting with or implementing WAN/LAN communications modules that facilitate cellular, Wi-Fi, Bluetooth, and NFC and other forms of communications between subscriber units, smart chutes, data acquisition modules, cloud based assets, service provider assets (e.g., servers) and the like.

Figure 8:
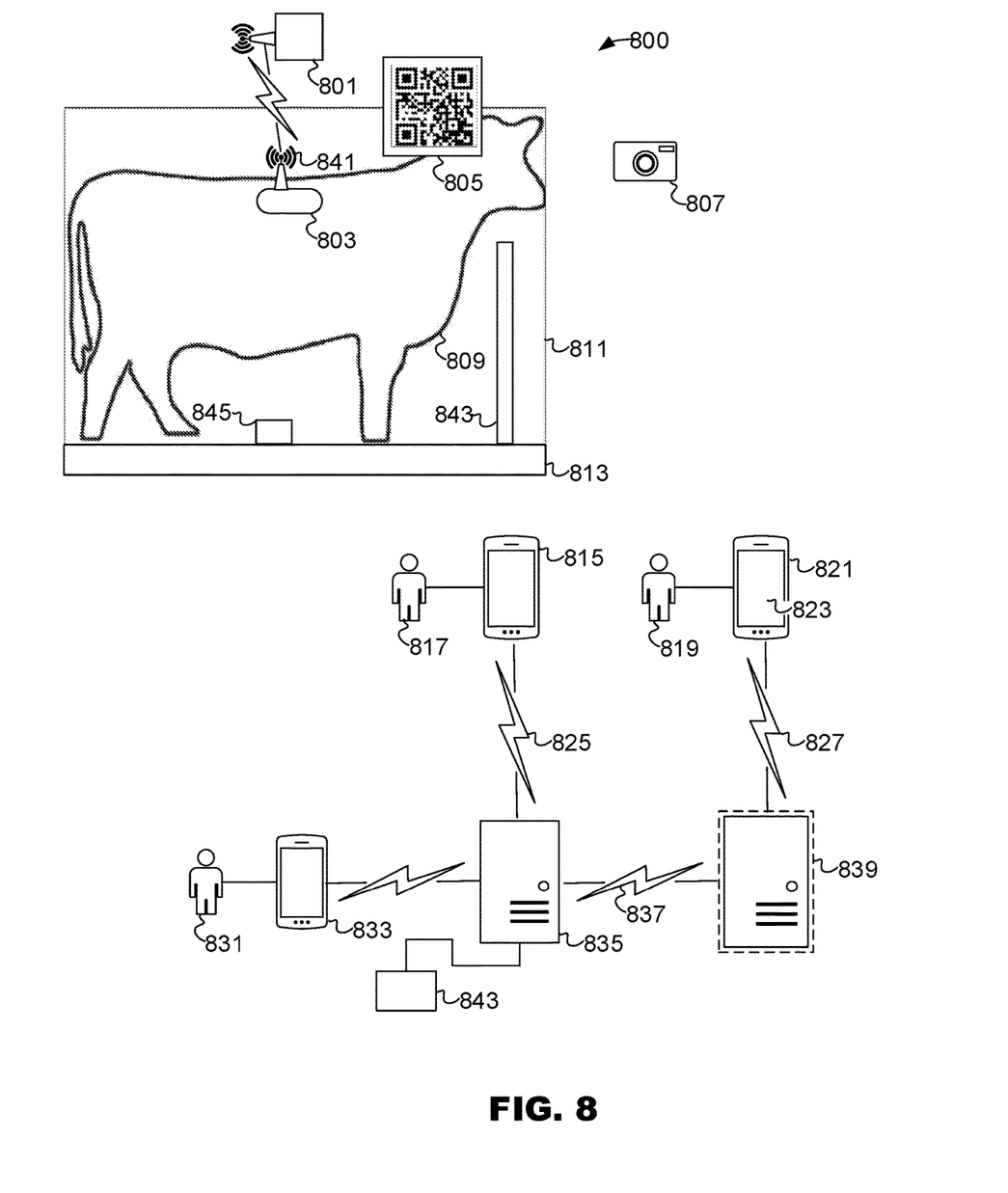
FIG. 8 depicts a system for conducting an agricultural exchange.

Referring now to FIG. 8, an agriculture exchange system 800 is illustrated that comprises an interrogator 801 for reading a tag 805 affixed to live animal 809. The tag includes animal identification data shown as a QR code. Alternatively, or in addition, interrogator 801 communicates using RFID technology with tag 803, which includes RFID circuitry 841. Interrogator 801 emits a frequency that excites RFID circuitry 841, which in turn emits identification data that interrogator 801 receives. Camera 807 captures and stores photographs of live animal 809. The photographs, identification data, and measured weight data are transmitted to centralized server 835. Centralized server 835 includes machine executable instructions (i.e., software instructions) stored on computer readable medium (e.g., a disk drive). The instructions enable centralized server 835 to store and maintain a product data card 843 for live animal 809. Centralized server 835 stores measured weight data, photographs, and identification data on product data card 843. As shown, system 800 includes smart animal chute 811 which isolates live animal 809 and automatically obtains weight data using transducer 813. As shown, live animal 809 is isolated using isolation unit 843 and the animal's presence is detected using presence detector 845. Presence detector 845 may operate using IR light, weight, or other such technologies. In alternative embodiments, transducer 813 includes a weight scale, body fat sensor, water sensor, or other biometric sensor to detect live animal data.

In operation of one embodiment, centralized server 835 receives the measured weight data, identification data, and photographs through link 825 from subscriber unit 815. User 817 operates subscriber unit 815 to enter additional information (e.g., notes) regarding live animal 809 through a user interface such as a keyboard or voice transcription application. Subscriber unit 815 may be a smart phone or tablet that runs an application comprising machine readable instructions that operate on a processor to enable communication with any combination of interrogator 801, camera 807, smart chute 811, weight scale 813, and centralized server 835. Such communication may occur through Wi-Fi, Bluetooth, NFC, cellular, or other wireless technologies. In various embodiments, some combination of camera 807 and interrogator 801 are incorporated into subscriber unit 815. For example, subscriber unit 815 may include a QR reader for accessing identification data from tag 805. In some embodiments, subscriber unit 815 or interrogator 801 loads tag 805 or tag 803 with measured data, information from product data card 843, photographic data, location data, or other data relevant to live animal 809.

As shown in FIG. 8, subscriber unit comprises machine executable instructions (e.g., software such as applications, an operating system, or lower level software) stored on a computer readable medium (e.g., memory such as ROM). The machine executable instructions enable the subscriber unit to receive measured data (e.g., weight data) from the smart animal chute, receive the identification data from the interrogator, and send the measured data and identification data over communication link 825 to centralized server 835. Centralized server 835 adds the measured data to product data card 843 for live animal 809 based at least in part on the identification data.

Accordingly, embodied systems include an interrogator (e.g., interrogator 801 separately or combined with subscriber unit 815) for obtaining identification information from an animal (e.g., live animal 809). The animal's tags (e.g., tag 803 or 805) are analyzed after the animal enters smart chute 811. Smart chute 811 mechanically isolates live animal 809 for processing and capturing data. A subscriber unit (e.g., subscriber unit 815) in some embodiments, stores an animal's identification information in the subscriber unit memory, stores the sensed (i.e., measured) animal data in the subscriber unit memory, uploads the identification information to a centralized location (e.g., centralized server 835), and similarly uploads the sensed animal data.

A centralized server (e.g., centralized server 835) receives the uploaded data, stores the uploaded data, and distributes the uploaded data to further subscriber units (e.g., a smartphone, tablet, data processing device, or networked computer) such as subscriber unit 833. In operation, user 831 might be interested in purchasing a live animal and may be directed to information on product data card 843 for live animal 809. Alternatively, user 831 may be a rancher that wishes to monitor the performance (e.g., weight gain, health, etc.) of his/her herd. Still further, user 831 could be a lender at a financial institution that wishes to monitor the relative value of collateral on a loan, as an example. For example, if members of a herd are healthy and heavy, the collateral would be worth more. Accordingly, user 831 receives the information over a graphical user interface on subscriber unit 833 through a data link with centralized server 835. Centralized server 835, alternatively or in addition, distributes the uploaded data to service provider 839. Service provider 839 receives product data card data 843 from centralized server 835 over data link 837. In turn, service provider 839 provides the data over communication link 827 to user 819 (e.g., a buyer, rancher, lender, auctioneer, etc.) through subscriber unit 821. Subscriber unit 821 includes user interface 823 (i.e., a buyer interface) that may be similar to or identical to that shown in FIG. 5. In some embodiments, service provider 839 conducts an auction and user 831 and user 819 simultaneously receive information on time remaining and bid activity.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the claimed subject matter is to be determined by the broadest permissible interpretation of the following claims and their equivalents, and shall not be restricted or limited by the foregoing detailed description.

The invention claimed is:

1. An apparatus comprising:
an interrogator for reading a tag affixed to a live animal, wherein the tag includes an animal identification data;
a smart animal chute comprising an isolation unit, one or more transducers and a processing unit, wherein the one or more transducers automatically obtain a measured data from the animal and communicate the measured data to the processor unit;
a handheld subscriber unit comprising first machine executable instructions stored on a first computer readable medium, wherein the first machine executable instructions enable the handheld subscriber unit for:
receiving the measured data from the smart animal chute; and
receiving the identification data from the interrogator;
a centralized server comprising second machine executable instructions stored on second computer readable medium, wherein the second machine executable instructions enable the centralized server for:
storing and maintaining a product data card in memory for the animal;
receiving the measured data and identification data sent from the handheld subscriber unit; and
adding the measured data to the product data card based at least in part on the identification data.

2. The apparatus of claim 1, wherein:
the interrogator is enabled to emit a radio frequency signal to energize the tag to emit a signal comprising the animal identification data.

3. The apparatus of claim 1, wherein:
the one or more transducers comprise a weighing scale; and
wherein the measured data comprises weight data.

4. The apparatus of claim 3, wherein the smart chute further comprises an animal presence detector.

5. The apparatus of claim 1, wherein the first machine executable instructions further enable the handheld subscriber unit for:
receiving entered data relevant to the animal.

6. The apparatus of claim 1, wherein the tag comprises a visible two-dimensional quick response code.

7. The apparatus of claim 1, wherein the tag comprises a radio frequency identification circuit.

8. The apparatus of claim 1, wherein:
the handheld subscriber unit comprises a Global Positioning System receiver for determining a location; and
the first machine executable instructions further enable the handheld subscriber unit to include the determined location to the measured data.

9. The apparatus of claim 1, wherein:
the second machine executable instructions further enable the centralized server for providing the measured data and entered data to a buyer interface based at least in part on the identification data.

10. The apparatus of claim 1, wherein:
the second machine executable instructions further enable the centralized server for providing the measured data and entered data to a service provider system.

11. A system comprising:
a smart chute including an isolation unit for isolating an animal, a processing unit, an interrogator for reading an animal identification data from an animal tag communicating the animal identification data to the processing unit, and one or more transducers for measuring an animal data from the animal and communicating the measured animal data to the processing unit;
a wireless handheld subscriber unit for wirelessly receiving the measured animal data and the animal identification data from the smart chute, and transmitting the measured animal data and the animal identification data; and
a centralized server for receiving the measured animal data and animal identification data from the wireless handheld subscriber unit.

12. The system of claim 11, wherein the animal tag includes a visible quick response tag.

13. The system of claim 11, wherein the animal tag includes radio frequency identification circuitry.

14. The system of claim 11, wherein:
the one or more transducers comprise a weight sensor; and
the measured animal data includes animal weight.

15. The system of claim 11, wherein the system further comprises a camera for photographing the animal.

16. The system of claim 11, wherein the animal tag is an ear tag.

17. The system of claim 11, wherein the animal tag is subcutaneous.

18. A system comprising:
an interrogator for obtaining an identification information from an animal, wherein the interrogator is integrated into a smart chute, or integrated into a handheld subscriber unit, or separate from the smart chute and the handheld subscriber unit;
the smart chute for isolating the animal and sensing an animal data using one or more transducers and a processing unit;
the handheld subscriber unit including a subscriber unit memory and subscriber unit processor,
wherein the handheld subscriber unit memory provides the subscriber unit memory with first machine executable instructions to enable the subscriber unit to:
store the identification information received from the interrogator in the subscriber unit memory;
store the sensed animal data received from the smart chute in the subscriber unit memory;
upload the identification information; and
upload the sensed animal data;
a centralized server including a server memory and server processor, wherein the server memory provides the server processor with second machine executable instructions to enable the centralized server to:
receive the uploaded identification information and sensed animal data received from the handheld subscriber unit;
store the uploaded identification information and sensed animal data;
distribute the uploaded identification information and sensed animal data to further handheld subscriber units.

19. The system of claim 18, wherein the second machine executable instructions further enable the centralized server to:
distribute the uploaded identification information and sensed animal data to a remote data processing system.

20. The system of claim 18, wherein the second machine executable instructions further enable the centralized server to:
distribute the uploaded identification information and sensed animal data to a buyer interface.

21. The system of claim 20, wherein the second machine executable instructions further enable the centralized server to:
compute a score for the animal based on the sensed animal data, one or more buyer preferences and data for other potential animals; and
distribute the score to the buyer interface.

22. The system of claim 20, wherein the second machine executable instructions further enable the centralized server to:
conduct an auction of the animal via the buyer interface and the further handheld subscriber units.

23. The system of claim 20, wherein the second machine executable instructions further enable the centralized server to:
search for any animals having stored sensed animal data that satisfies one or more buyer criteria via the buyer interface.

* * * * *